(12) United States Patent
Prabhakar et al.

(10) Patent No.: US 9,113,162 B2
(45) Date of Patent: Aug. 18, 2015

(54) DYNAMIC PACKET SIZE CONTROL FOR MPEG-4 DATA PARTITION MODE

(75) Inventors: Ram Prabhakar, Palo Alto, CA (US); Harikrishna M. Reddy, San Jose, CA (US); Lefan Zhong, Santa Clara, CA (US); Wei Sun, San Jose, CA (US); Leonardo Vainsencher, San Jose, CA (US); Visalakshi Vaduganathan, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 2158 days.

(21) Appl. No.: 12/005,910

(22) Filed: Dec. 27, 2007

(65) Prior Publication Data

US 2008/0225957 A1 Sep. 18, 2008

Related U.S. Application Data

(62) Division of application No. 10/721,709, filed on Nov. 25, 2003.

(51) Int. Cl.
*H04N 7/12* (2006.01)
*H04N 19/103* (2014.01)
(Continued)

(52) U.S. Cl.
CPC ........... *H04N 19/103* (2014.11); *H04N 19/129* (2014.11); *H04N 19/136* (2014.11); *H04N 19/152* (2014.11); *H04N 19/159* (2014.11);
(Continued)

(58) Field of Classification Search
CPC ........................... H04N 19/103; H04N 19/152

USPC ............... 375/240.01, 240.03, 240.12, 240.2, 375/240.24, 240.26; 382/238, 248
IPC ........................................................ H04N 7/12
See application file for complete search history.

(56) References Cited

U.S. PATENT DOCUMENTS

| 5,001,559 A | 3/1991 | Gonzales et al. |
| 5,974,184 A | 10/1999 | Eifrig et al. |

(Continued)

FOREIGN PATENT DOCUMENTS

| EP | 1575301 | 9/2005 |
| EP | 1879388 | 1/2008 |

(Continued)

OTHER PUBLICATIONS

E.S. Jang et al., "Version 2 Visual WD rev 6", International Organization for Standaradization, Dec. 1998, pp. 1-464, XP002335257.

(Continued)

*Primary Examiner* — Young Lee (57) ABSTRACT

A dynamic AC prediction technique is implemented in a data partition mode which automatically disables AC prediction for encoding the current macroblock in the next packet when packet overflow occurs. Otherwise, when there is no overflow, AC prediction remains enabled to maintain compression efficiency. More particularly, in the preferred embodiment, a determination is first made whether a macroblock causes a packet overflow if it is encoded in the current packet. If so, a new packet is initiated into which the macroblock is encoded without AC prediction as the first macroblock. Otherwise, the macroblock with AC prediction remains in the current packet and a new macroblock is encoded.

8 Claims, 6 Drawing Sheets

(51) Int. Cl.
*H04N 19/159* (2014.01)
*H04N 19/176* (2014.01)
*H04N 19/129* (2014.01)
*H04N 19/61* (2014.01)
*H04N 19/593* (2014.01)
*H04N 19/136* (2014.01)
*H04N 19/152* (2014.01)
*H04N 19/48* (2014.01)
*H04N 19/42* (2014.01)
*H04N 19/89* (2014.01)

(52) U.S. Cl.
CPC .............. *H04N 19/176* (2014.11); *H04N 19/42* (2014.11); *H04N 19/48* (2014.11); *H04N 19/593* (2014.11); *H04N 19/61* (2014.11); *H04N 19/89* (2014.11)

(56) References Cited

U.S. PATENT DOCUMENTS

| | | | |
|---|---|---|---|
| 6,097,842 | A | 8/2000 | Suzuki et al. |
| 6,341,144 | B1 | 1/2002 | Haskell et al. |
| 6,556,625 | B2 | 4/2003 | Haskell et al. |
| 7,092,442 | B2 | 8/2006 | Zhang et al. |
| 7,113,646 | B2 | 9/2006 | Youn |
| 7,167,520 | B2 | 1/2007 | Yoshioka et al. |
| 7,535,961 | B2 | 5/2009 | Cho et al. |
| 8,705,630 | B2 | 4/2014 | Pappas et al. |
| 2002/0044603 | A1 | 4/2002 | Rajagopalan et al. |
| 2002/0064228 | A1 | 5/2002 | Sethuraman et al. |
| 2002/0176500 | A1 | 11/2002 | Bakhmutsky et al. |
| 2004/0013399 | A1 | 1/2004 | Horiguchi et al. |
| 2004/0091049 | A1 | 5/2004 | Yamaguchi et al. |
| 2004/0219626 | A1 | 11/2004 | Vaupel et al. |
| 2005/0201463 | A1 | 9/2005 | Lee et al. |
| 2006/0088104 | A1 | 4/2006 | Molloy et al. |

FOREIGN PATENT DOCUMENTS

| | | |
|---|---|---|
| JP | 6038243 | 2/1994 |
| JP | 8009385 | 1/1996 |
| JP | 8046971 | 2/1996 |
| JP | 2001016594 | 1/2001 |
| JP | 2001346215 | 12/2001 |
| JP | 2003286541 | 10/2003 |
| JP | 2004242309 | 8/2004 |
| WO | 9529561 | 11/1995 |

OTHER PUBLICATIONS

Fukunaga et al., "MPEG-4 Video Verification Model 16.0, V1, 3.4-3.6", International Organization for Standardization, vol. N3312, Mar. 2000, pp. 58-81, XP002335258.

Moccagatta et al., "Error-Resilient Coding in JPEG-2000 and MPEG-4", IEEE Journal on Selected Areas in Communications, IEEE Inc. New york, US, vol. 18 No. 6, Jun. 2000, pp. 899-914, XP0009333877.

Ad hoc group on MPEG-4 video VM editing; MPEG-4 Video Verification Model Version 7.0; Video Group; Bristol, Apr. 1997.

Advanced Video Coding for Generic Audiovisual Services; Series H: Audiovisual and Multimiedia Systems; ITU-T (International Telecommunication Union) Mar. 2005.

IEEE Xplore; DSP-Based Multi-Format Video Decoding Engine for Media Adapter Applications; Yi-Shin Tung, Member, IEEE, Sung-Wen Wang, Chien-Wu Tsai, Ya-Ting Yang, and Ja-Ling Wu, Senior Member, IEEE; Issue Date: Feb. 2005; vol. 51 Issue:1; On pp. 273-280; ISSN: 0098-3063.

ITU-T: Telecommunication Standardization Sector of ITU; H.264 (Mar. 2005); Series H: Audiovisual and Multimedia Systems; Infrastructure of audiovisual services—Coding of moving video; Advanced video coding for generic audiovisual services.

DYNAMIC PACKET SIZE CONTROL FOR MPEG-4 DATA PARTITION MODE

RELATED APPLICATIONS

The present application is a divisional of and claims the benefit of U.S. patent application Ser. No. 10/721,709, filed Nov. 25, 2003, entitled "DYNAMIC PACKET SIZE CONTROL FOR MPEG-4 DATA PARTITION MODE," naming Ram Prabhakar, Harikrishna M. Reddy, Lefan Zhong, Wei Sun, Leonardo Vainsencher, and Visalakshi Vaduganathan as inventors, assigned to the assignee of the present invention. That application is incorporated herein by reference in its entirety and for all purposes.

The present application is related to U.S. patent application No. 12/005,861, filed Dec. 27, 2007, entitled "DYNAMIC PACKET SIZE CONTROL FOR MPEG-4 DATA PARTITION MODE," naming Ram Prabhakar, Harikrishna M. Reddy, Lefan Zhong, Wei Sun, Leonardo Vainsencher, and Visalakshi Vaduganathan as inventors, assigned to the assignee of the present invention. That application is incorporated herein by reference in its entirety and for all purposes.

FIELD OF THE INVENTION

The invention generally relates to computer systems, and more particularly relates to dynamic packet size control in MPEG-4 data partition mode.

BACKGROUND OF THE INVENTION

Moving Pictures Experts Groups (MPEG) is an International Standards Organization (ISO) standard for compressing video data. Video compression is important in making video data files, such as full-length movies, more manageable for storage (e.g., in optical storage media), processing, and transmission. In general, MPEG compression is achieved by eliminating redundant and irrelevant information. Because video images typically consist of smooth regions of color across the screen, video information generally varies little in space and time. As such, a significant part of the video information in an image is predictable and therefore redundant. Hence, a first objective in MPEG compression is to remove the redundant information and leaving only the true or unpredictable information. On the other hand, irrelevant video image information is information that cannot be seen by the human eye under certain reasonable viewing conditions. For example, the human eye is less perceptive to noise at high spatial frequencies than noise at low spatial frequencies and less perceptive to loss of details immediately before and after a scene change. Accordingly, the second objective in MPEG compression is to remove irrelevant information. The combination of redundant information removal and irrelevant information removal allows for highly compressed video data files.

MPEG compression incorporates various well-known techniques to achieve the above objectives including: motion-compensated prediction, Discrete Cosine Transform (DCT), quantization, and Variable-Length Coding (VLC). DCT is an algorithm that converts pixel data into sets of spatial frequencies with associated coefficients. Due to the non-uniform distribution of the DCT coefficients wherein most of the non-zero DCT coefficients of an image tend to be located in a general area, VLC is used to exploit this distribution characteristic to identify non-zero DCT coefficients from zero DCT coefficients. In so doing, redundant/predictable information can be removed. Additionally, having decomposed the video image into spatial frequencies under DCT means that higher frequencies via their associated DCT coefficients can be coded with less precision than the lower frequencies via their associated DCT coefficients thereby allowing irrelevant information to be removed. Hence, quantization may be generalized as a step to weight the DCT coefficients based on the amount of noise that the human eye can tolerate at each spatial frequency so that a reduced set of coefficients can be generated.

Additionally, MPEG compression also includes additional compression stages such as Alternative Coefficient/Discrete Coefficient (AC/DC) prediction. AC is typically defined as a DCT coefficient for which the frequency in one or both dimensions is non-zero (higher frequency). DC is typically defined as a DCT coefficient for which the frequency is zero (low frequency) in both dimensions. An AC/DC prediction module predicts the AC and DC for the current block based on AC and DC values of adjacent blocks such as an adjacent left top block, a top block, and an adjacent left block. For example, the prediction can be made as follows:

If ($|B-A| \geq |B-C|$) then X=A
else X=C where B is the AC or DC value of the left top block relative to the current block, C is the AC or DC value of the top block relative to the current block, A is the AC or DC value of the left block relative to the current block, and X is the AC or DC value of the current block.

Such predictions and other features are described in "MPEG-4 Information Technology-Coding of Audio-Visual Objects-Part 2: Visual" ISO/IEC/14496-2:1999 which is herein incorporated by reference in its entirety. Additionally, U.S. Pat. No. 6,341,144 and its continuation U.S. Pat. No. 6,556,625 describes in detail AC/DC predictions and are herein incorporated by reference in their entirety.

Compressed video data is vulnerable to transmission errors. MPEG-4 offers error resilience tools to localize the effects of errors, re-establish synchronization, and recover erroneous data. The end result is more reliable data transmission. These tools include data partition, packetization, and reversible VLC. Data partitioning is designed to localize and isolate the effects of errors by separating and partitioning motion and shape data from texture data in a video packet. A video packet is made up of one or several macroblocks. A frame (a.k.a. Video Object Plane in MPEG-4 terminology) consists of several packets. Each packet starts with markers and the packet header. The data in each packet are encoded independently relative to other packets. Data partition mode in MPEG-4 requires data in any packet to be divided into three parts. Each part consists of bitstream components from all macroblocks in the packet. During data partition mode, a packet size (i.e., the number of data bits in the packet) is limited to 2048 bits for simple profile level-1 video bitstream, 4096 bits for simple profile level-2 video bitstream, and 8192 bits for simple profile level-3 video bitstream.

As a result of the strict packet sizes in data partition mode, there are inherent concerns about packet data overflow during the encoding of a macroblock. To prevent the data loss associated with packet overflow, a macroblock which causes the overflow needs to be re-encoded in a new packet. However, if the AC prediction is always turned on during data partition mode, such re-encoding may cause a change in the AC prediction direction and predicted differences which in turn effects the ZigZag run length of the bitstream. Conversely, if the AC prediction is turned off completely during data partition mode, the compression efficiency is negatively impacted.

Thus, a need exists for a method and apparatus to prevent video packet overflow in a MPEG data partition mode while minimizing the compression efficiency impact and maintaining the video quality.

SUMMARY OF THE INVENTION

Accordingly, the present invention provides a method and apparatus to prevent video packet overflow in a MPEG data partition mode while minimizing the compression efficiency impact and maintaining video quality.

The present invention meets the above need with a dynamic AC prediction technique for a data partition mode. In according to the present invention, the dynamic AC prediction technique first determines whether a macroblock causes a packet overflow if it is encoded in the current packet. If so, a new packet is initiated into which the macroblock is encoded without AC prediction as the first macroblock. Otherwise, the macroblock with AC prediction remains in the current packet and a new macroblock is encoded.

All the features and advantages of the present invention will become apparent from the following detailed description of its preferred embodiments whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention is related to MPEG compressed video image data, it is to be appreciated that the present invention is also applicable to other data compression schemes involving video, audio, text, software, and other types of data.

In accordance to the present invention, a dynamic AC prediction technique is implemented for a data partition mode which automatically disables AC prediction for encoding the current macroblock in the next packet when packet overflow occurs. Otherwise, when there is no overflow, AC prediction remains enabled to maintain compression efficiency. More particularly, in the preferred embodiment, a determination is first made whether a macroblock causes a packet overflow if it is encoded in the current packet. If so, a new packet is initiated into which the macroblock is encoded without AC prediction as the first macroblock. Otherwise, the macroblock with AC prediction remains in the current packet and a new macroblock is encoded. Although no AC prediction is performed for a macroblock during re-encoding into a new packet, no quality degradation occurs in the new packet because, as the first macroblock of a new packet, the macroblock is not likely to have high correlation with macroblocks from the previous packet hence no AC prediction is likely needed and carried out for the first macroblock. However, AC prediction is performed for the subsequent macroblocks in the new packet relative to this first macroblock. The above factors contribute to improve video quality.

Figure 1:
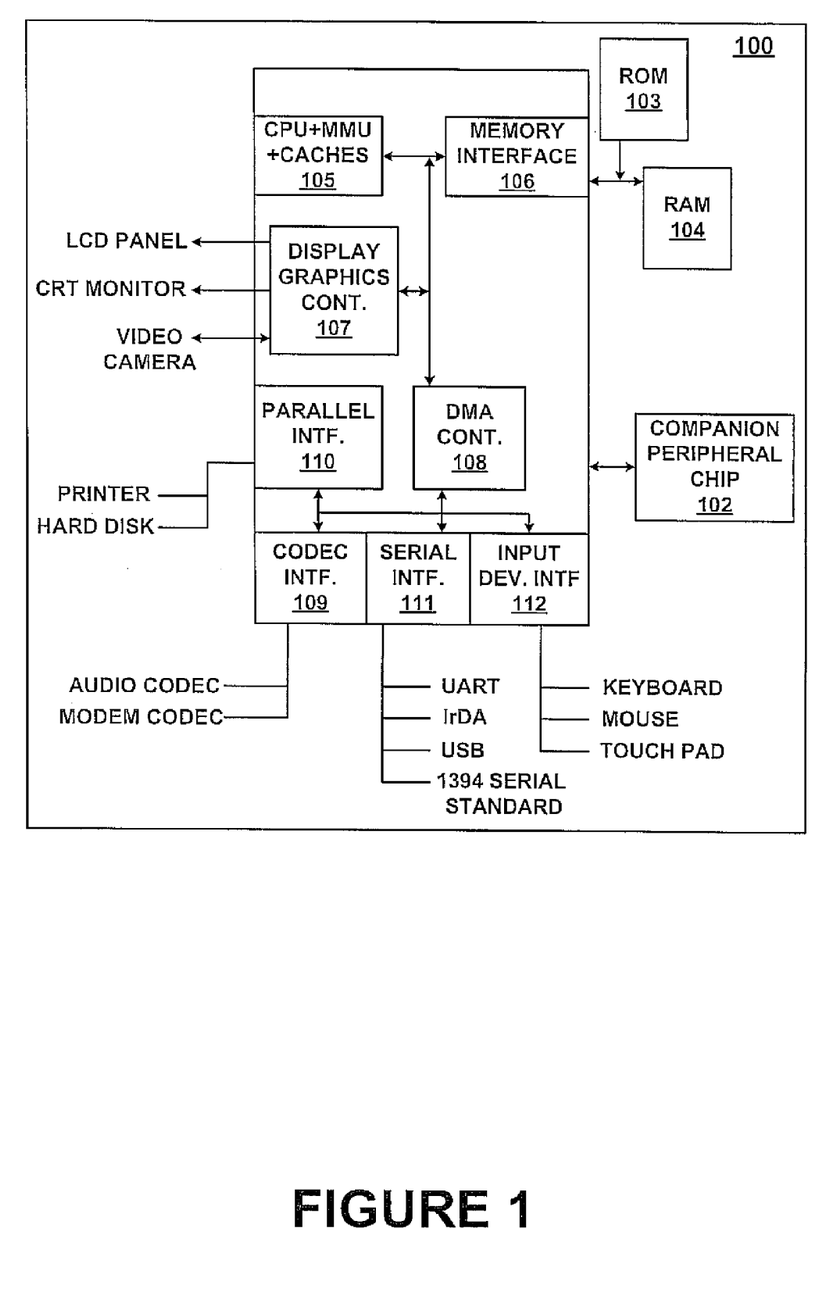
FIG. 1 illustrates, for example, a high-level diagram of a computing device 100 which implements the present invention.

Reference is now made to FIG. 1 illustrates, as an example, a high-level diagram of computer system 100 in which the present invention may be implemented or practiced. More particularly, computer system 100 may be a laptop or handheld computer system. It is to be appreciated that computer system 100 is exemplary only and that the present invention can operate within a number of different computer systems including desktop computer systems, general-purpose computer systems, embedded computer systems, and others.

As shown in FIG. 1, computer system 100 is a highly integrated system which includes of integrated processor circuit 101, peripheral controller 102, read-only-memory (ROM) 103, and random access memory (RAM) 104. The highly integrated architecture allows power to be conserved. Peripheral controller 102 is optional if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, and input device interface 112. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as Universal Asynchronous Receiver Transmitter (UART), Universal Serial Bus (USB), and Firewire (IEEE 1394) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. DMA controller 108 also sends data from CODEC interface 109, parallel interface 110, serial interface 111, and input device interface 112 to RAM 104 via memory interface 106. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
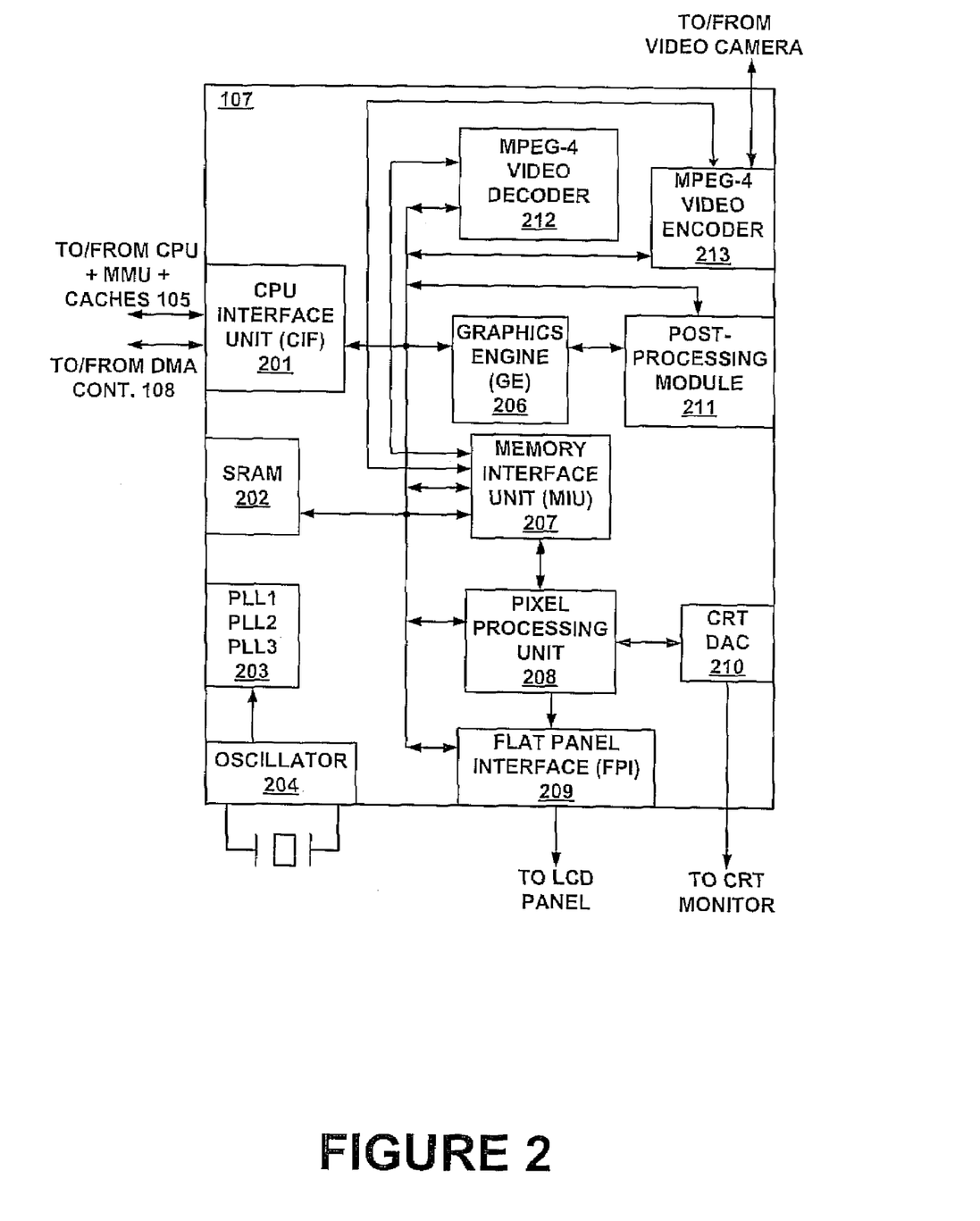
FIG. 2 illustrates in greater detail graphics/display controller 107 of the computing device 100.

The present invention is implemented as part of graphics/display controller 107. Reference is now made to FIG. 2 illustrating in greater detail graphics/display controller 107. In general, graphics/display controller 107 comprises CPU Interface Unit (CIF) 201, SRAM 202, Phase Lock Loop (PLL) circuit 203, oscillator 204, pixel processing logic 208, Graphics Engine (GE) 206, Memory Interface Unit (MIU) 207, Flat Panel Interface (FPI) 209, CRT Digital-to-Analog Converter (DAC) 210, post-processing module 211, MPEG-4 video decoder 212, and MPEG-4 video encoder 213. Graphics/display controller 107 further includes a video input port to accommodate a video camera or any other input video signal including playback of a stored video input whether analog or digital. CIF 201 provides the interface to processing unit 105 and DMA controller 108. Accordingly, CIF 201 routes requests and video/image data received from processing unit 105 to the desired destination. In particular, CIF 201 sends register read/write requests and memory read/write requests from the host CPU processing unit 105 and DMA controller 108 to the appropriate modules in graphics/display controller 107. For example, memory read/write requests are passed on to MIU 207 which in turn reads/writes the data from/to the frame buffer in SRAM 202. CIF 201 also serves as the liaison with DMA controller 108 to fetch data from system memory (ROM 103 and RAM 104) and provides the data to GE 206 and MIU 207. Further, CIF 201 has a number of control registers which can be programmed by the host CPU in processing unit 105 to control the MPEG post-processing process (e.g., the content of some of the control registers may be used to configure MPEG-4 decoder 212). CIF 201 also passes compressed video/image bitstream, including encoded video signals with dynamic AC prediction as taught in accordance with the present invention, to MPEG-4 decoder 212 to perform image construction/decompression. CIF 201 further passes uncompressed video/image bitstream received from a source connected to codec interface 109 or serial interface 111 to MPEG-4 encoder to perform compression before the compressed bitstream can be transmitted to a device connected directly or remotely to integrated processor circuit 101.

The frame buffer in SRAM 202 is used to store the pixmap (i.e., a pixel pattern mapped into the frame buffer) of the image to be displayed on the monitor as well to act as a temporary buffer for various purposes. Additionally, SRAM 202 may have memory allocated for video buffers and transactional registers. GE 206 processes graphics/video image data which is then stored in the buffer in SRAM 202 based on commands issued by the host CPU. GE 206 performs graphics operations (e.g., BitBLTs and ROPs, area fills, line drawing) and provides hardware support for clipping, transparency, rotation, color expansion, and others. GE 206 through a built-in Stretch Block Transfer (STRBLT) function further performs video image expansion, progressive scanning conversion, YcbCr (YUV) to RGB color-space conversion, etc. In short, GE 206 frees processing unit 105 from the video/graphics display rendering function to allow processing unit 105 to perform time-critical or real-time operations.

MIU 207 controls all read and write transactions from/to the frame buffer, video buffers, and transactional registers in SRAM (frame buffer) 202. Such read and write requests may come from the host CPU via CIF 201, GE 206, pixel processing logic 208, FPI 209, etc. In addition, MIU 207 performs tasks associated with memory addressing, memory timing control, and others. Post-processing module 211 removes blocking and ringing artifacts from decompressed MPEG video image data to improve the quality of the decompressed video data. The decompressed MPEG video image data can be received from, for example, an optical media player via serial interface 111 or MPEG-4 decoder 212. The filtered video image data is then sent to SRAM 202.

Pixel processing logic 208 retrieves video/graphics data from the buffers in SRAM 202 via MIU 207, serializes the image data into pixels, and formats the pixels into predetermined formats before outputting them to FPI 209 or CRT DAC 210. Accordingly, pixel processing logic 208 generates the required horizontal and vertical display timing signals, memory addresses, read requests, and control signals to access image data stored in SRAM 202. If the display device involved is a LCD, pixel data from pixel processing logic 208 is sent to FPI 209 before being passed on to the LCD. FPI 209 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from pixel processing logic 208 to analog Red Green and Blue (RGB) signals to be displayed on the CRT monitor.

Figure 3:
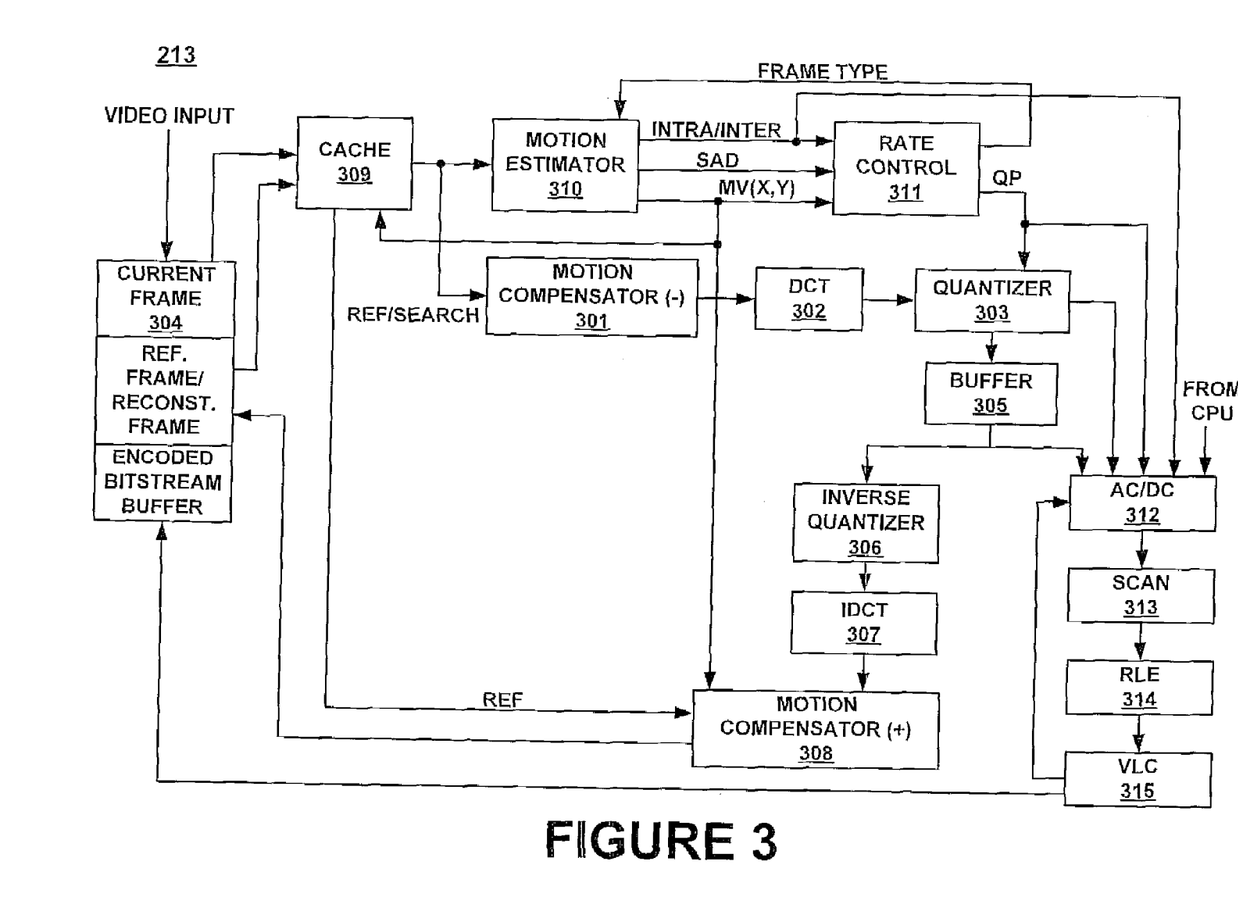
FIG. 3 illustrates the relevant components of an embodiment of MPEG encoder 213 which implements the present invention.

Reference is now made to FIG. 3 illustrating in greater detail exemplary MPEG-4 video encoder 213 that implements an embodiment of the present invention. As shown in FIG. 3, MPEG-4 video encoder 213 includes motion compensator (−) (MC−) 301, DCT module 302, quantizer 303, memory 304, buffer 305, inverse quantizer 306, Inverse DCT (IDCT) module 307, motion compensator (+) (MC+) 308, cache 309, motion estimator 310, rate control module 311, alternative coefficient/discrete coefficient (AC/DC) module 312, scan module 313, run-length event (RLE) module 314, and variable length coding (VLC) 315. It is clear that the scope of the present invention covers embodiments in which the MPEG-4 video encoder (i.e., the video encoding function) resides externally and independently of graphics/display controller 107.

Video input from a source such as a video camera connected to system 100 is provided to memory 304. The video input from the source is the current video frame data. Preferably, memory 304 is separated into a current frame area to store data from the current video input, a reference frame/reconstructed frames area to store data from the reference video frame and data from a video frame reconstructed from compression, and an encoded bitstream buffer to store data from a freshly encoded video frame by encoder 213. Cache 309 fetches current video frame data from memory 304 one macroblock at a time and reference video frame data several macroblocks at a time (these several macroblocks are adjacent neighbors). Cache 309 receives as input the motion vectors associated with the "good" match video block determined from motion estimator 310. Cache 709 provides data from the current video frame and data from the reference video frame to MC−301 and motion estimator 310 based on the motion vectors of the "good" match video block received. Cache 309 also provides data from the reference video frame to MC+308 based on the motion vectors of the "good" match video block received. Each macroblock typically has six blocks of data (YUV 4:2:0) in which four (Y0-Y3) are luminance data and two (U & V) are chrominance data.

MC-301 is essentially a subtractor in which prediction data from a reference video frame is subtracted from data from a current video frame, which has been presented in the correct order for encoding according to the desired Group Of Pictures (GOP) structure. The subtractor is disabled (e.g., the prediction is set to zero) for I-frames or I-macroblocks. The output of MC-301, which is the prediction error (or the video input in the case of I-frames), is passed to DCT module 302 which performs the Discreet Cosine Transformation (DCT) and outputs DCT coefficients to quantizer 303. The DCT coefficients generally include a single DC coefficient and a number of AC coefficients. Some of the AC coefficients are non-zero. While the DC coefficient represents the average value in the macroblock, the AC coefficients represent various harmonic frequencies in the macroblock. The DCT coefficients are arranged in a coefficient block that is equivalent in size (8×8) to the pixel block. Quantizer 303 carries out the quantization process which may be generalized as a step to weight the DCT coefficients based on the amount of noise that the human eye can tolerate at each spatial frequency so that a reduced set of coefficients can be generated. This may be generally accomplished by scaling the coefficient signals using a scalar value $Q_P$. This causes some of the small coefficients to be divided down and truncated to zero thereby reducing the number of quantization levels available for encoding. The quantized DCT coefficients are provided to buffer 305 for temporary storage before they are passed on to AC/DC prediction module 312 and inverse quantizer 306. In the preferred embodiment, buffer 305 is 48 rows deep×96 bits wide dual port SRAM with one port dedicated for write operations from quantizer 303 and the other port dedicated for read operations to inverse quantizer 306 and AC/DC prediction module 312.

AC is typically defined as a DCT coefficient for which the frequency in one or both dimensions is non-zero (higher frequency). DC is typically defined as a DCT coefficient for which the frequency is zero (low frequency) in both dimensions. AC/DC prediction module 312, which implements the present invention, predicts the AC and DC for the current block based on a gradient prediction analysis of the AC and DC values of adjacent blocks such as an adjacent left top block, a top block, and an adjacent left block. For example, the prediction can be made as follows:

If ($|B-A| \geq |B-C|$) then X=A else X=C where B is the AC or DC value of the left top block relative to the current block, C is the AC or DC value of the top block relative to the current block, A is the AC or DC value of the left block relative to the current block, and X is the AC or DC value of the current block.

Figure 4:
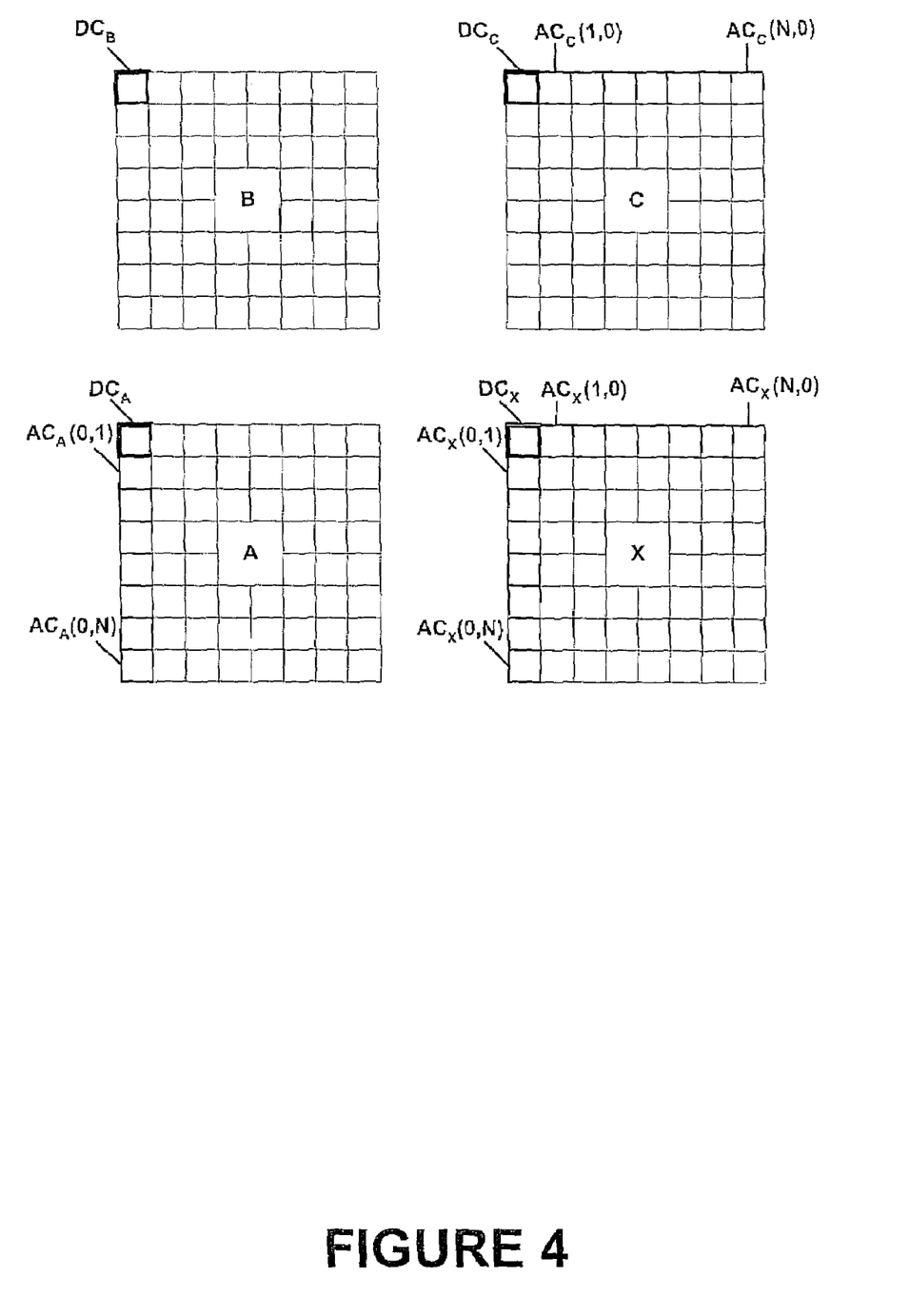
FIG. 4 illustrates a format structure of adjacent DCT coefficient blocks to be processed by AC/DC prediction module 312 which implements the present invention.

FIG. 4 illustrates a format structure of adjacent DCT coefficient blocks to be processed by AC/DC prediction module 312. As shown, in each DCT coefficient block, the DC coefficient is situated at the very upper left corner and the AC coefficients are provided throughout the remainder of the block with the most significant (e.g., nonzero) coefficients being situated horizontally in the first row (i.e., the row occupied by the DC coefficient) or vertically in the first column (i.e., the column occupied by the DC coefficient).

Referring now back to FIG. 3, buffer 305 stores the AC and DC coefficients values of the current macroblocks X and at least the AC and DC coefficient values of adjacent macroblocks A, B, and C relative to the current macroblock X. Adjacent macroblocks A, B, and C are all processed before the current macroblocks so buffer 305 stores the coefficients of a predetermined number of processed macroblocks received over time from quantizer 303. As each new macroblock is processed, the content of buffer 504 is updated/reorganized to reflect the appropriate adjacent macroblocks A, B, and C.

In accordance with the present invention, AC/DC prediction module 312 has three AC prediction modes: always on, always off, and dynamic on. AC/DC prediction module 312 selects one of three prediction modes and generates an AC prediction flag to identify a mode of operation. AC/DC prediction module 312 outputs a DC residual signal, AC signals (representing either AC coefficients or AC residuals), and AC prediction flag.

The order of operation of AC/DC prediction module 312 and quantizer 303 in the data path of MPEG encoder 213 is insignificant. It should be clear to a person of ordinary skill in the art that while FIG. 3 illustrates quantizer 303 preceding AC/DC prediction module 312 in the data path, the order of the circuits may be reversed with AC/DC prediction module 312 preceding quantizer 303.

Additional bandwidth efficiency can be achieved by tying a scan direction of VLC module 315 to the gradient prediction. For this reason, AC/DC prediction module 312 provides the AC and DC predicted coefficients to scan module 313 which forms a 64-elements long vector from the two-dimensional array macroblock such that the low frequency (e.g., DC) components are placed at the beginning of the vector. The gradient analysis and inter/intra analysis performed in AC/DC prediction module 312 is used to select one of three scan directions: Alternate-Horizontal, Alternate-Vertical, and ZigZag (ZZ). Tables 1-3 summarizes the order of the three aforementioned scan patterns. More particularly, Tables 1-3 illustrate three 8×8 arrays each having a number in each array cell indicating the order the content of the corresponding cell is being accessed by scan module 312 to form the 64-elements vector. As a partial illustration of a scan consider for example Table 1, the Alternate-Horizontal Scan pattern, the scan starts from the most upper left cell with the number zero (0), the position of the DC residual coefficient of the block. From this cell, the scan traverses three positions in the horizontal direction (i.e., 0-3). From the fourth cell, the scan jumps down to the first cell of the second row. From this cell, the scan traverses one position in the horizontal direction (i.e., 4-5). Next, the scan jumps down to the first cell of the third row and traverses one position in the horizontal direction (i.e., 6-7). The scan continues following the same logic in an ascending order.

TABLE 1

Alternate-Horizontal Scan Pattern

| 0 | 1 | 2 | 3 | 10 | 11 | 12 | 13 |
|---|---|---|---|----|----|----|----|
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 53 | 54 | 55 | 60 | 61 | 62 | 63 |

TABLE 2

Alternate-Vertical Scan Pattern

| 0 | 4 | 6 | 20 | 22 | 36 | 38 | 52 |
|---|---|---|----|----|----|----|----|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |

TABLE 2-continued

Alternate-Vertical Scan Pattern

| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

TABLE 3

ZigZag Scan Pattern

| 0  | 1  | 5  | 6  | 14 | 15 | 27 | 28 |
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Scan module 313 provides the 64-elements vector to RLE module 314 to generate run-level events. In general, RLE module 314 determines the number of consecutive zeros in the vector and forms RLE acceptable words based on the determination. After quantization, there are likely a significant number of zeros (likely to be the high frequency components) in the block and there is no need to transmit or store such information. Accordingly, a RLE word represents the number of zeros between consecutive non-zero elements in the vector. The RLE word also includes the value of the last non-zero element after the zeros and information indicating whether this value is the very last component in the vector.

The RLE words are provided to VLC module 315 which maps RLE words into VLC patterns. For example, certain RLE words are given specific bit pattern. The most common RLE words are given the shortest VLC bit pattern. VLC patterns are specified in MPEG-4 standard. (See "MPEG-4 Information Technology-Coding of Audio-Visual Objects-Part 2: Visual" ISO/IEC/14496-2:1999). Run-length and variable-length coding (the combination coding) are commonly referred to as Huffman coding) and can be combined into one VLC module. In general, due to the non-uniform distribution of the DCT coefficients wherein most of the non-zero DCT coefficients of an image tend to be located in a general area, VLC and run-length encoding are used to exploit this distribution characteristic to identify non-zero DCT coefficients from zero DCT coefficients. In so doing, redundant/predictable information can be removed. The encoded (i.e., compressed) block of video frame data is then sent to memory 304 for storing in the encoded frame cache.

The process of motion compensated prediction requires a signal on which to base the prediction. This signal represents the reference/previous video frame data which is stored in the reference cache of memory 304. To ensure that the prediction process in MPEG-4 video encoder 213 bases its prediction on a signal that is substantially similar to that available in MPEG-4 video decoder 212 (i.e., a remote video decoder), a local decoder is included in video encoder 213 to generate a locally decoded signal in the encoder. The local decoder, which consists of inverse quantizer 306, IDCT 307, and MC+ 308, basically undoes the encoding stages of quantizer 303 and DCT 302 to produce a decoded prediction error and adds it back into a suitably delayed version of the prediction (reference frame) data to produce a locally decoded (reconstructed) signal with motion compensation. The delayed prediction data is provided by cache 309.

The reconstructed signal is sent to the reconstruction cache of memory 304 for storage. For each macroblock in the current video frame, motion estimator 310, which implements the present invention, searches for a "good" matched macroblock in the reference video frame based on a minimum SAD value. Motion estimator 310 receives as input blocks of current frame and reference frame data. Motion estimator 310 also receives a signal indicating the frame type from rate control module 311. Motion estimator 310 also determines the motion vector. Motion estimator 310 further determines whether a macroblock in the current video frame is intra (encoded independently) or inter (encoded after motion compensation). These determinations are communicated to rate control module 311 and AC/DC prediction module 312. The motion vector determinations are communicated to cache 309 and MC+308.

The rate of the bitstream output by VLC module 315 may fluctuate over time depending on the content of the video data (i.e., changing scenes and objects). This variable bit rate may be undesirable at times. Instead, a constant bit rate may be desirable to fit the available channel or in the case of statistical multiplexing so that a constant bit rate can be shared between several video signals. Hence, depending on the application, either variable bit rate or constant bit rate is selected. It is then important to ensure that the average bit-rate of the buffer input is the same as that of the channel and neither buffer overflows or underflows. Rate control module 311 is used to control the average bit rate at the bitstream buffer in memory 304 to stay inside an acceptable limit range to prevent overflow and underflow. To achieve the average bit rate control, rate control module 311 varies the quantization factors in quantizer 303 and AC/DC module 312. While coarser scale generates a lower average bit rate, at the expense of picture quality, a finer scale produces better pictures but at a higher average bit rate. As the buffer fills, quantizer 303 and AC/DC module 312 get coarser, which tends to reduce the average bit rate, helping the buffer to empty. Additionally, rate control module 311 takes into consideration the expected differences (e.g., through modeling projection) in bit rates generated by I and P frames.

Figure 5:
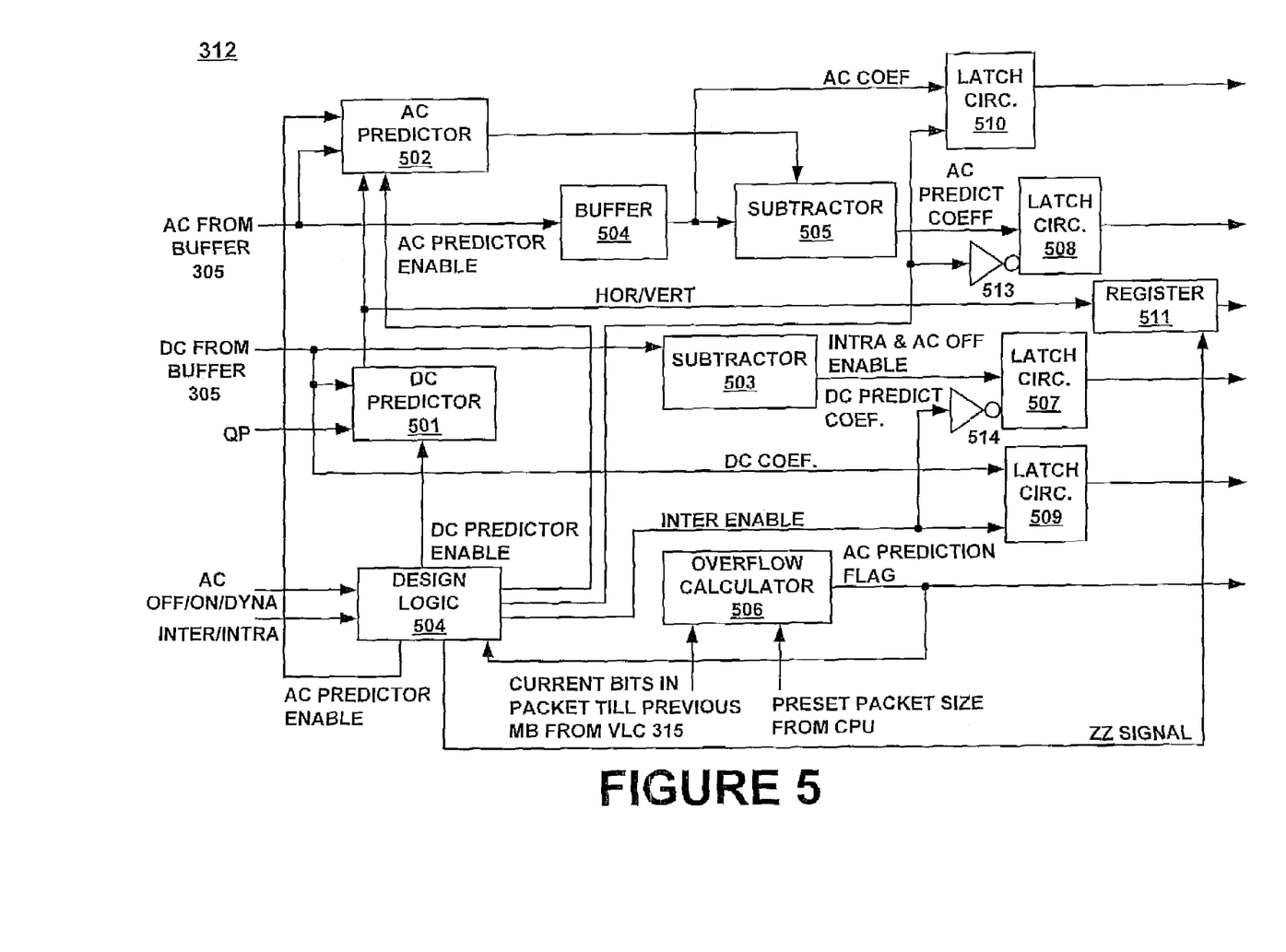
FIG. 5 illustrates the relevant components of an exemplary embodiment of AC/DC prediction module 312 which implements the present invention.

Referring to FIG. 5 illustrating a block diagram of the relevant components of an exemplary embodiment of AC/DC prediction module 312 which implements the present invention. As shown in FIG. 5, AC/DC prediction module 312 comprises DC predictor 501, AC predictor 502, subtractor/adder 503, decision logic 504, subtractor/adder 505, overflow calculator 506, latch circuits 507-510, program register 511, and inverters 513-514.

Decision logic 507 receives as inputs inter/intra signal from motion estimator 210, AC on/off/dynamic signal from an external program register (not shown) that is programmed by the CPU, and AC prediction flag from overflow calculator 506. In response, decision logic 507 outputs zz signal to program register 511, inter enable signal to latches 507 and 509, intra & AC-off enable signal to latch circuits 508 and 510, DC predictor enable signal to DC predictor 501, and AC predictor enable signal to AC predictor 502. By providing AC prediction flag signal and AC predictor enable signal as inputs to an AND-gate and AC prediction flag signal and AC predictor enable signal as inputs to another AND-gate, when AC prediction flag signal is deasserted, it overrides AC predictor enable signal and intra & AC off enable signal to essentially reverse the effect of their states (e.g., from low to high or from high to low). When AC prediction flag is asserted, the effect of the states of AC predictor enable signal and intra & AC off enable signal are maintained.

If decision logic 504 receives inter/intra input signal indicating that the current macroblock is inter, decision logic 504 asserts inter enable signal, asserts intra & AC off enable signal, asserts ZZ signal, deasserts DC predictor enable signal, and deasserts AC predictor enable signal. When asserted, ZZ signal sets the MSB in program register 511 to high. When asserted, inter enable signal disables latch circuit 507 because inter enable signal is provided to inverter 514 prior to reaching latch circuit 507, respectively. Conversely, when asserted, inter enable signal enables latch circuit 509. When asserted, intra & AC-off enable signal disables latch circuit 508 because intra & AC-off enable signal is provided to inverter 513 prior to reaching latch circuit 508. Conversely, when asserted, inter enable signal enables latch circuit 509 and intra & AC-off enables signal enables latch circuit 510. When deasserted, DC predictor enable signal disables DC predictor 501 and AC predictor enable signal disables AC predictor 502. In so doing, DC predictor 501 and AC predictor 502 are disabled and the DC and AC coefficients from buffer 305 which are provided as inputs to latch circuits 509 and 510, respectively, are provided as outputs of latch circuits 509 and 510 to scan module 313 which is commanded by the MSB of program register 511 to perform a ZZ scan. The AC and DC coefficients are provided to a current data packet in the data partition mode.

If inter/intra input signal indicates the current macroblock is intra and AC on/off/dynamic signal indicates that the selected AC mode is off, decision logic 504 asserts intra & AC off enable signal, deasserts inter enable signal, deasserts AC predictor enable signal, asserts DC predictor enable signal, deasserts AC predictor enable signal, and asserts ZZ signal which sets the MSB in program register 511 to high. When asserted, intra & AC-off enable signal disables latch circuit 508 via inverter 513 while enables latch circuit 510. When deasserted, inter enable signal disables latch circuit 509 while enables latch circuit 507 via inverter 514. The deasserted AC predictor enable signal disables AC predictor 502. The asserted DC predictor enable signal enables DC predictor 501. In so doing, DC prediction is performed, AC prediction is disabled, the AC coefficients from buffer 305, which are provided as inputs to latch circuit 510, are provided as outputs of latch circuit 510 to scan module 313, and the DC predict coefficient (residual signal) from subtractor 503 is provided as output of latch circuit 507 to scan module 313. Scan module 313 is commanded by the MSB of program register 511 to perform a ZZ scan. The AC coefficients and DC predict coefficients are provided to a current data packet in the data partition mode.

If inter/intra input signal indicates the current macroblock is intra and AC on/off/dynamic signal indicates that the selected AC mode is on, decision logic 504 deasserts intra & AC-off enable signal, deasserts inter enable signal, asserts AC predictor enable signal, asserts DC predictor signal, and deasserts ZZ signal to set the MSB in program register 511 to low. When the MSB of program register is low, then its LSB is used to determine whether the scan direction is horizontal or vertical. When deaserted, intra & AC-off enable signal disables latch circuit 510 while enables latch circuit 508 via inverter 513. When deasserted, inter enable signal disables latch circuit 509 while enables latch circuit 507. The asserted DC predictor enable signal and asserted AC predictor enable signal enables DC predictor 501 and AC predictor 502, respectively. In so doing, DC prediction is performed, AC prediction is performed, the AC predict coefficients (residual signal) from subtractor 505 is provided as output of latch circuit 508 to scan module 313, and the DC predict coefficient (residual signal) from subtractor 503 is provided as output of latch circuit 507 to scan module 313. With the MSB of program register 511 set to low, scan module 313 is commanded by the LSB of program register 511 which is programmed by the value of the hor/vert signal generated by DC predictor 501. As an example, if the LSB of program register 511 is high, the scan module 313 performs an alternate-horizontal scan. If the LSB of program register 511 is low, the scan module 313 performs an alternate vertical scan. The AC coefficients and DC predict coefficients are provided to a current data packet in the data partition mode.

If inter/intra input signal indicates the current macroblock is intra and AC on/off/dynamic signal indicates that the selected AC mode is dynamic, decision logic 507 deasserts intra & AC-off enable signal, deasserts inter enable signal, asserts AC predictor enable signal, asserts DC predictor enable signal, and deasserts ZZ signal to set the MSB in program register 511 to low. In so doing, DC prediction is enabled, AC prediction is enabled, the AC predict coefficients (residual signal) from subtractor 505 is provided as output of latch circuit 508 to scan module 313, and the DC predict coefficients (residual signal) from subtractor 503 is provided as output of latch circuit 507 to scan module 313. This represents the first pass for the AC prediction dynamic mode. With the MSB of program register 511 set to low, scan module 313 is commanded by the LSB of program register 511 which is programmed by the value of the hor/vert signal generated by DC predictor 501. As an example, if the LSB of program register 511 is high, the scan module 313 performs an alternate-horizontal scan. If the LSB of program register 511 is low, the scan module 313 performs an alternate vertical scan.

In view of the functions and description related to decision logic 504 as well as other information provided in the detailed description section, a person of ordinary skill in the art should be able to easily design a decision logic that performs the functions described.

In accordance to the present invention, during the second pass of the AC dynamic mode, overflow calculator 506 determines whether the current packet has exceeded the maximum packet size under the present selected data partition mode (e.g., 1024 bits, 2048 bits, or 4096 bits). If the maximum packet size selected is not exceeded if the current macroblock is added to the current packet, overflow calculator 506 asserts AC prediction flag signal which is provided to RLE 314 and to AC predictor 502 to so signify. When asserted, AC prediction flag further indicates to AC predictor 502 that AC prediction is to continue. Otherwise, overflow calculator 506 deasserts AC prediction flag signal to signify to RLE 314 that the current macroblock is added to the next packet and that AC prediction is to be disabled. Hence, AC prediction flag signal overrides AC predictor enable signal as well as Intra & AC off enable signal from decision logic 504. Overflow calculator 506 determines that an overflow condition occurs according to the following equation:

$$(\text{Nonzero\#}-\text{DCnonzero\#})*31+128+\text{BitsInPacket}>\text{PacketSize}$$

wherein Nonzero# is the number of nonzero AC coefficients determined by the AC prediction process, DCnonzero# is the number of nonzero DC coefficients determined by the DC prediction process, 31 is the maximum size for a nonzero coefficient, 128 is the maximum bits for part 1 and part 2 of a macroblock processed in data partition mode, BitsInPacket is the number of bits currently in the packet until the previous macroblock, and PacketSize is the preset packet size for the data partition mode.

Overflow calculator 506 receives as inputs Nonzero# signal from AC predictor 502 after AC prediction is carried out for the entire current macroblock, DCnonzero# signal from DC predictor 501 after DC prediction is carried out for the entire current macroblock, BitsInPacket signal from VLC 315, and PacketSize signal from CPU 205. It should be clear to a person of ordinary skill in the art that overflow calculator 506 can be made part of decision logic 504.

In summary, if an overflow condition is detected in the second pass of AC prediction dynamic mode, AC prediction is then disabled and the AC coefficients provided by buffer 305 and the DC predict residual signal are provided to scan module 313 and then to RLE module 314 via latch circuits 510 and 507, respectively. With AC prediction flag deasserted indicating the overflow condition, RLE module 314 put the DC predict signal and the AC coefficients of the present macroblock into the next packet. No prediction for AC coefficient is performed in this case because as the first macroblock in the new packet, it has little correlation with previous macroblocks. No prediction means no unnecessary lossy compression and no degraded video quality. If no overflow condition is detected, the AC predict residual and DC predict residual signals are provided to scan module 313 and then to RLE module 314 via latch circuits 508 and 507, respectively. Hence, in accordance with the present invention, AC prediction is dynamically performed to optimize compression efficiency while maintaining video quality by not implementing unnecessary compression.

DC predictor 501 and AC predictor 502 perform gradient analyses. DC predictor 501 compares $DC_A$, a DC coefficient of block A (see FIG. 4 for an illustration of the position of blocks A, B, C, and X), with a $DC_B$, a DC coefficient of block B, to determine the vertical gradient. DC predictor 501 also compares $DC_C$, a DC coefficient of block C, with $DC_B$, the DC coefficient of block B to determine the horizontal gradient. The vertical and horizontal gradients are compared to each other with the greater gradient relative to block B to be used as a basis of prediction. This is because block B is the farthest block relative to the current block X and the greater gradient relative to block B is indicative that the involved adjacent block (A or C) relative to the current block X likely has a higher correlation with the current block.

If the vertical gradient is greater than the horizontal gradient, block A will likely have high correlation with block X and DC predictor 501 employs horizontal prediction which uses block A as the basis for prediction of block X. Conversely, if the horizontal gradient is greater than the vertical gradient, block C will likely have high correlation with block X and DC predictor 501 employs vertical prediction which uses block C as the basis for prediction of block X. DC predictor 501 generates hor/vert signal based on whether horizontal or vertical prediction is used. DC predictor 501 provides the DC coefficient of the block used for prediction to subtractor/adder 503 which subtracts/adds the DC coefficient output by DC predictor 501 from/to the DC coefficient of block X to obtain the DC predict coefficient (residual signal) for block X. Before sending the DC coefficient of the block used for prediction to subtractor/adder 503, DC predictor 501 performs an integer division operation on the DC coefficient using a DC_scaler which is based on the quantization step size $Q_P$ used in the quantization process of the relevant block. In an alternate embodiment, DC predictor 501 and subtractor/adder 503 can be combined into one circuit. Table 4 below summarizes, as an example, the DC_ Scaler values for different component types and step sizes $Q_P$. Hence, DC predictor 501 combined together with subtractor/adder 503 perform the following:

If (predict from block C)

$$QF_X = PQF_X + F_C // DC\_scaler$$

Else (if predict from block A)

$$QF_X = PQF_X + F_A // DC\_scaler$$

where $QF_X$ is the DC predict coefficient (residual signal), $PQF_X$ is the DC coefficient of the current block X, $F_C$ and $F_A$ are the DC coefficients of blocks C and A, respectively.

TABLE 4

| | DC_ Scaler Values | | | |
|---|---|---|---|---|
| Component: Type | $Q_P$ = 1-to-4 | $Q_P$ = 5-to-8 | $Q_P$ = 9-to-24 | $Q_P \geq$ 25 |
| Luminance: Type1 | 8 | $2*Q_P$ | $Q_P + 8$ | $2*Q_P - 16$ |
| Chrominance: Type2 | 8 | $(Q_P + 13)/2$ | $(Q_P + 13)/2$ | $Q_P - 6$ |

AC predictor 502 and subtractor/adder 505 utilize a substantially similar scheme to generate AC predict residual signal. In an alternate embodiment, AC predictor 502 and subtractor/adder 504 can be combined into one circuit. AC predictor 502 utilizes hor/vert signal generated by DC predictor 501 to determine whether a horizontal prediction (i.e., in which block A is used as basis for AC prediction for current block X) or vertical prediction (i.e., in which block C is used as basis for AC prediction for current block X) is employed. The AC coefficients from a DCT transform that may exhibit the highest correlation between blocks are those in the same first row or the same first column as the DC coefficient. If horizontal prediction is used, the AC coefficients from the same column as the DC coefficient in block A are used. Accordingly, for each AC coefficient of block X in the same column as the DC coefficient (i.e., $AC_X(0,1)$ through $AC_X(0,n)$), AC predictor 502 performs a prediction corresponding to the similarly located AC coefficient from block A (i.e., $AC_A(0,1)$ through $AC_A(0,n)$). If vertical prediction is used, the AC coefficients from the same row as the DC coefficient in block C are used. Accordingly, for each AC coefficient of block X in the same row as the DC coefficient (i.e., $AC_X(1,0)$ through $AC_X(n,0)$), AC predictor 502 performs a prediction corresponding to the similarly located AC coefficient from block C (i.e., $AC_C(0,1)$ through $AC_C(0,n)$).

AC predictor 502 provides the AC coefficients of the block used for prediction to subtractor 505 which subtracts/adds the AC coefficients output by AC predictor 502 from/to the AC coefficients of block X to obtain the AC predict coefficient (residual signal) for block X. Before sending the AC coefficient of the block used for prediction to subtractor/adder 505, AC predictor 502 performs a integer scaling operation on the AC coefficients using the ratio between the quantization step size $Q_P$ of the relevant adjacent block A or C (based on prediction direction) and the quantization step size $Q_{PX}$ of present block X. This compensates for the differences in the quantization of previous horizontally adjacent or vertically adjacent blocks used in AC prediction Hence, AC predictor 502 combined together with subtractor/adder 505 perform the following:

If (predict from block C)

$$QF_X[j][0] = PQF_X[j][0] + (QF_C[j][0] * QP_C) // QP_X$$

Else (if predict from block A)

$$QF_X[0][i] = PQF_X[0][i] + (QF_A[0][i] * QP_A) // QP_X$$

where i=1 to 7, j=1 to 7, $QF_X[i][j]$ is the AC predict coefficient (residual signal) from the X block, $QF_A[i][j]$ is the AC coefficient from the A block, $QF_C[i][j]$ is the AC coefficient from the C block, $PQF_X[i][j]$ is the AC coefficient of the current block X, and $QP_A$, $QP_C$, & $QP_X$ are the quantization step sizes associated with blocks A, C, and X, respectively.

In the present embodiment, latch circuits 507 and 509 each consists of six D-type flip flops connected together which are designed to accommodate the total six DC coefficients of the six blocks Y0, Y1, Y2, Y3, U, and V (i.e., one DC coefficient per block) in a macroblock. Other types of flip flops can also be used. Latch circuits 508 and 510 each consists of forty-two D-type flip flops connected together which are designed to accommodated the total forty-two AC coefficients of the six blocks Y0, Y1, Y2, Y3, U, and V (i.e., seven AC coefficients per block) in a macroblock. Latch circuits 507-508 are designed to store all the AC and DC predict residual signals following the prediction process for all six blocks in the macroblock before outputting them.

Figure 6:
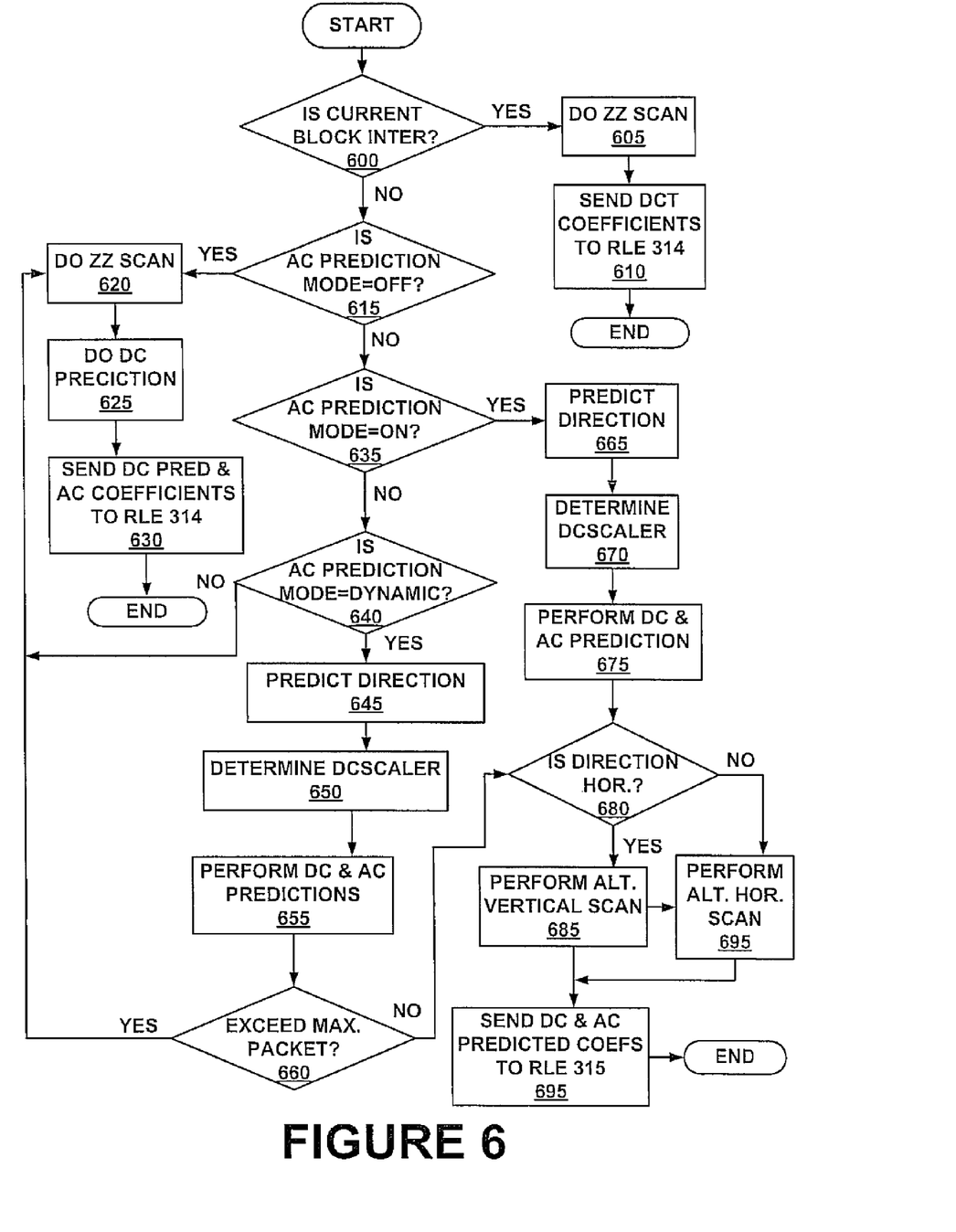
FIG. 6 is a flow chart illustrating an embodiment of the dynamic AC prediction method in accordance to the present invention.

The operation of AC/DC prediction module 312 as described above may also be performed in software using a programmed processor or digital signal processor. FIG. 6 is a flow chart illustrating an embodiment of the dynamic AC prediction method in accordance to the present invention. In step 600, a determination is made whether the current macroblock is inter or intra. If the current macroblock is inter, a zz scan is performed (step 605) and the ZZ scanned AC and DC coefficients are sent to RLE module 314 (step 610). If the current macroblock is intra, it is determined whether the AC prediction mode is OFF (step 615). If the AC prediction mode is OFF, DC prediction is performed (step 620) and zz scan is performed (step 625). The scanned AC coefficients and the DC predict residual coefficients are sent to RLE module 314 (step 630). If the AC prediction mode is not OFF, it is determined whether the AC prediction mode is ON (step 635).

If the AC prediction mode is ON, DC & AC prediction are performed (step 665), predict direction (hor/vert) is determined (step 670), DC_Scaler value is determined (step 675). The order of these three steps may changed. Next, it is determined whether the predict direction is horizontal (step 680). If yes, an alternate-vertical scan is performed (step 685) and the scanned AC & DC predict residuals are sent to the RLE (step 695). If not, an alternate-horizontal scan is performed (step 690) and the scanned AC & DC predict residuals are sent to the RLE (step 695).

If the AC prediction mode is not ON, a determination is made whether the AC prediction mode is Dynamic (step 640). If the AC prediction mode is Dynamic, DC & AC prediction are performed (step 645), predict direction (hor/vert) is determined (step 650), DC_Scaler value is determined (step 655). The order of these three steps may changed. Next, it is determined whether, with the current macroblock, the current packet exceeds the maximum preset limit (step 660). If yes, steps 620-630, which are discussed earlier, are carried out. If not, it is determined whether the predict direction is horizontal (step 680). If yes, an alternate-vertical scan is performed (step 685) and the scanned AC & DC predict residuals are sent to the RLE (step 695). If not, an alternate-horizontal scan is performed (step 690) and the scanned AC & DC predict residuals are sent to the RLE (step 695).

A couple embodiments of the present invention, a method and apparatus to prevent video packet overflow in a MPEG data partition mode while minimizing the compression efficiency impact and maintaining the video quality, are presented. While the present invention has been described in particular embodiments, the present invention should not be construed as limited by such embodiments, but rather construed according to the below claims.

What is claimed is:

1. A system for performing dynamic AC prediction, said system comprising:
a processor;
a memory coupled to said processor a display coupled to said processor;
a graphics controller coupled to said processor and comprising a component for performing dynamic AC prediction, said component comprising:
a DC prediction component coupled to said decision logic and for performing DC prediction for a current macroblock using DC coefficients associated with at least one adjacent macroblock;
an AC prediction component for performing AC prediction for said current macroblock using AC coefficients associated with said at least one adjacent macroblock; and
a decision logic coupled to said AC prediction component, said decision logic for determining whether an overflow condition is to occur in a current data packet if said current macroblock is encoded in said current data packet, said decision logic further for, if no overflow condition is to occur, maintaining said AC prediction in an enabled state and designating said current macroblock for encoding in said current data packet wherein said graphics controller further comprises a video encoder, said video encoder comprising a buffer, a variable-length coder, and said component; wherein said decision logic is further operable to, before determining whether said overflow condition is to occur, determine a macroblock type of said current macroblock, wherein said decision logic is further operable to, if said current macroblock comprises an inter block, supply said AC coefficients and said DC coefficients to said variable-length coder for encoding said current macroblock in said current data packet, wherein said decision logic is further operable to, if said current macroblock comprises an intra block, determine an AC prediction mode status associated with said AC prediction, wherein said decision logic is further operable to, if said AC prediction is disabled, supply said AC coefficients and DC predict coefficients to said variable-length coder for encoding said current macroblock in said current data packet, and wherein said decision logic is further operable to, if said AC prediction is enabled, supply AC predict coefficients and said DC predict coefficients to said variable-length coder for encoding said current macroblock in said current data packet.

2. The system of claim 1, wherein said decision logic is further operable to, if said overflow condition is to occur:
suspend said AC prediction and designate said current macroblock for encoding in a new data packet; and
control performing a second DC prediction for said current macroblock.

3. The system of claim 1, wherein said decision logic is further operable to, if no overflow condition is to occur, supply AC predict coefficients to a variable-length coder for encoding said current macroblock in said current data packet, and wherein said decision logic is further operable to, if said overflow condition is to occur, supply said AC coefficients to a variable-length coder for encoding said current macroblock in a new data packet.

4. The system of claim 1, wherein said decision logic is further operable to determine whether said overflow condition is to occur in said current packet prior to said AC prediction component performing further AC prediction for said current macroblock.

5. The system of claim 1, wherein said AC prediction of said AC prediction component and said determining whether an overflow condition is to occur by said decision logic are performed in a data partition mode.

6. The system of claim 1, wherein said decision logic is further operable to, if no overflow condition is to occur, determine a predict direction associated with said AC prediction, wherein said decision logic is further operable to, if said predict direction is determined to be horizontal, generate a signal for performing an alternate-horizontal scan, and wherein said decision logic is further operable to, if said predict direction is determined to be vertical, generate a signal for performing an alternate-vertical scan.

7. The system of claim 1, wherein said decision logic is further operable to, if said overflow condition is to occur, generate a signal for performing a zig-zag scan.

8. The system of claim 1, wherein said AC coefficients comprise a transform coefficient data set, wherein said transform coefficient data set is accessed from a buffer, and wherein said transform coefficient data set is generated using a discrete cosine transform prior to storage in said buffer.

* * * * *